Oct. 11, 1949.    L. W. WACHTER    2,484,325
TIPPING SPREADER
Filed Feb. 5, 1945    7 Sheets-Sheet 1

Inventor
Lester W. Wachter
by Parker + Carter
Attorneys.

Oct. 11, 1949.   L. W. WACHTER   2,484,325
TIPPING SPREADER
Filed Feb. 5, 1945                                           7 Sheets-Sheet 2

Inventor
Lester W. Wachter
by Parker & Carter
Attorneys.

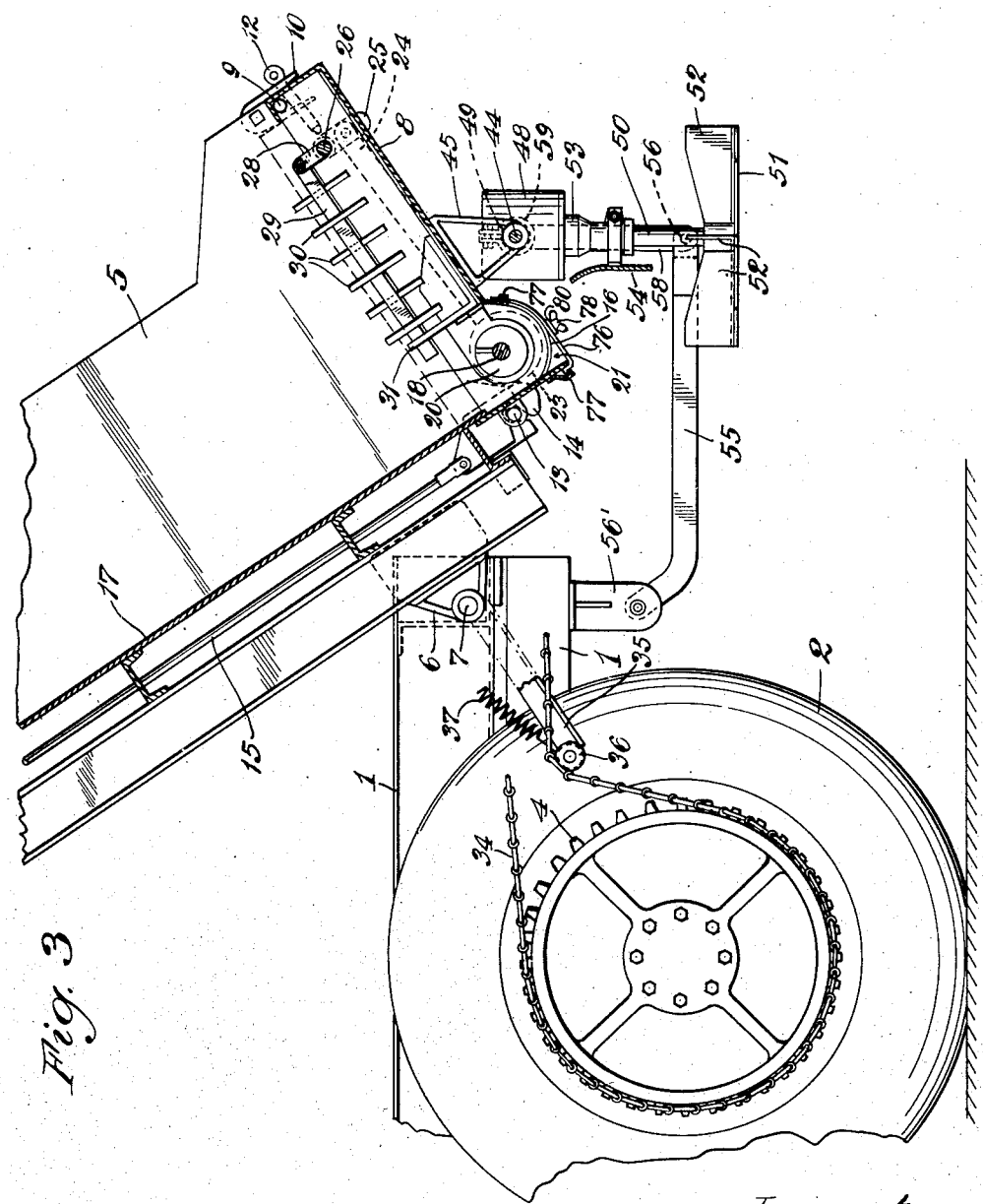

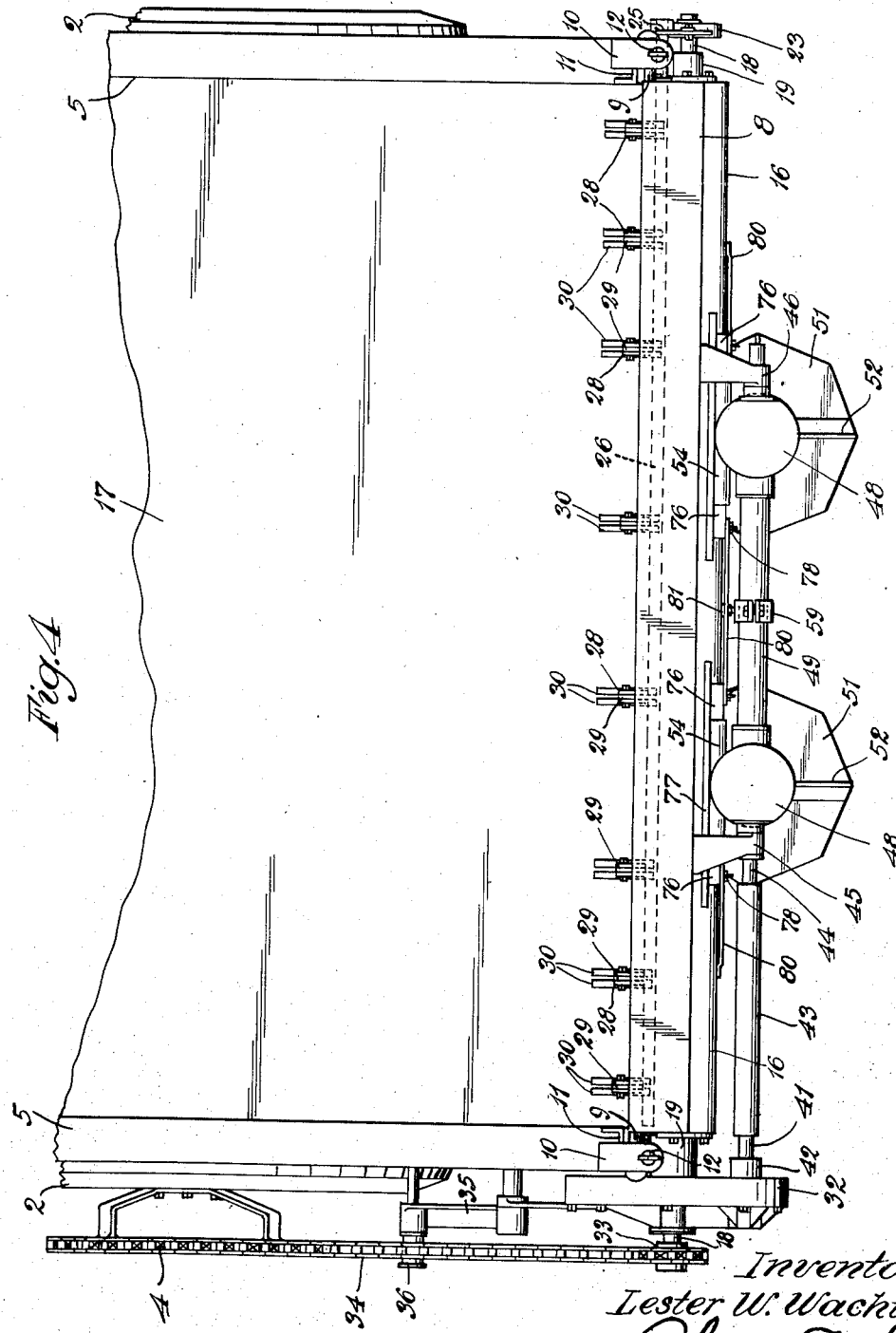

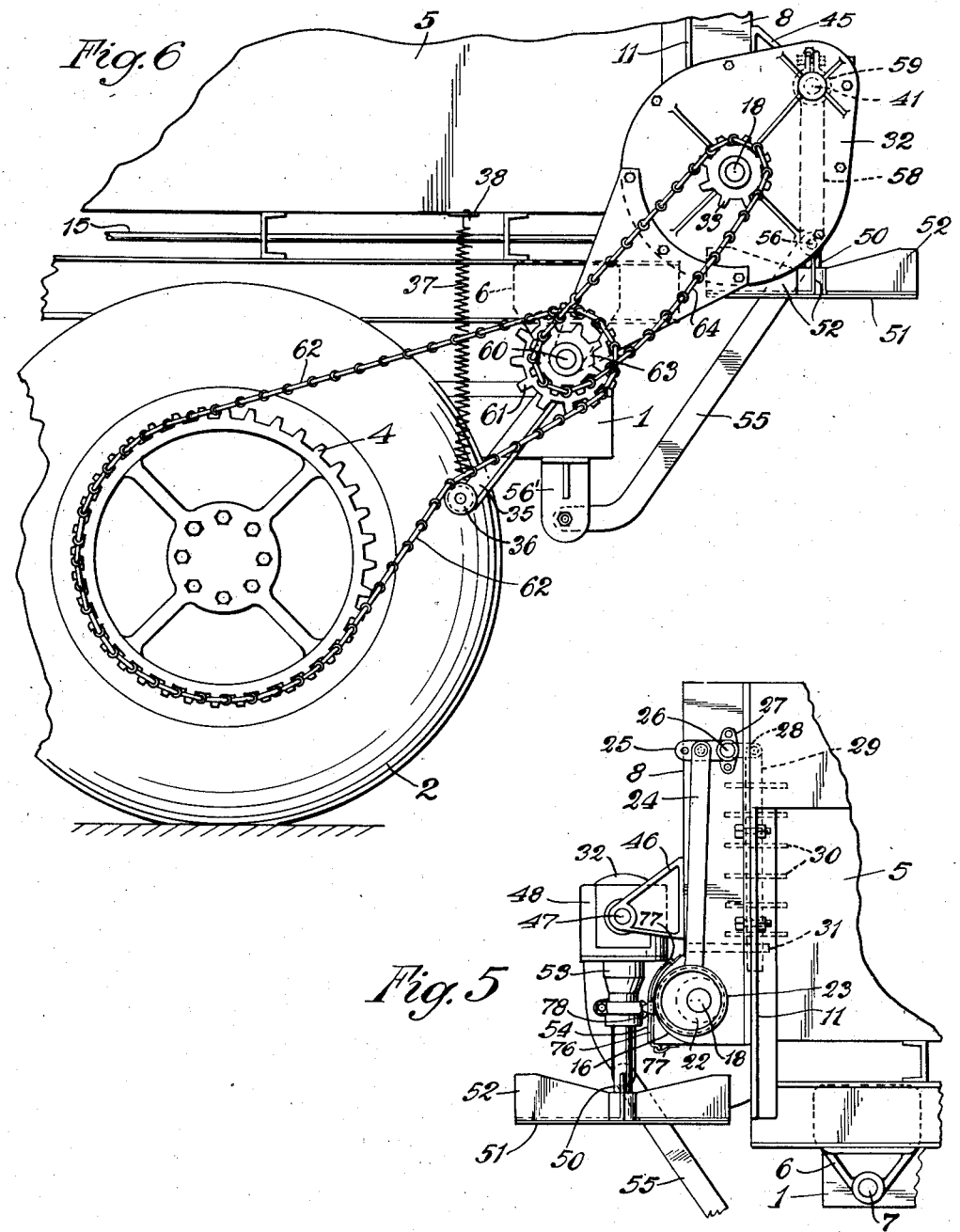

Oct. 11, 1949.  L. W. WACHTER  2,484,325
TIPPING SPREADER
Filed Feb. 5, 1945  7 Sheets-Sheet 6
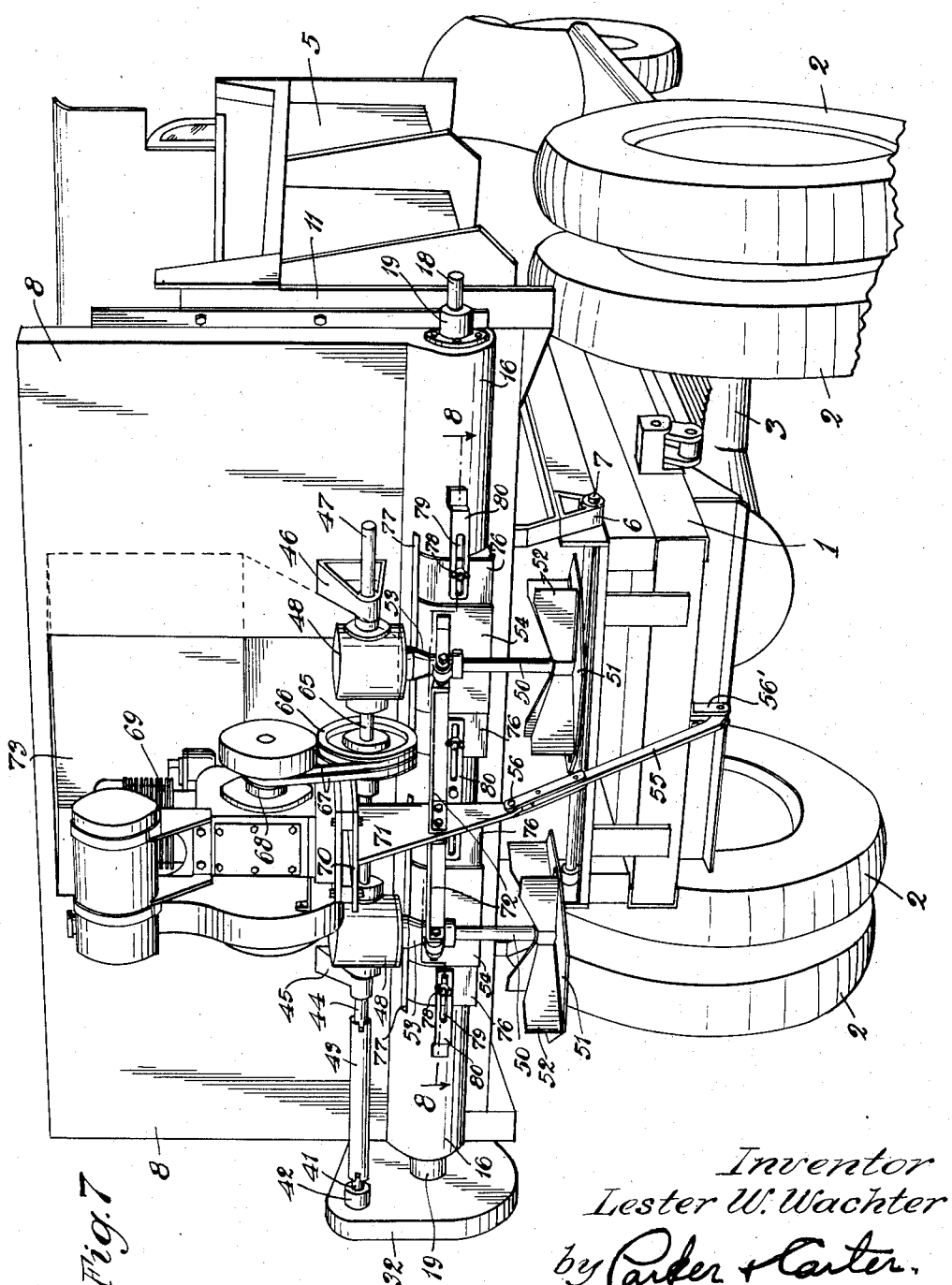
Inventor
Lester W. Wachter
by Parker & Carter,
Attorneys.

Oct. 11, 1949.  L. W. WACHTER  2,484,325
TIPPING SPREADER
Filed Feb. 5, 1945  7 Sheets-Sheet 7
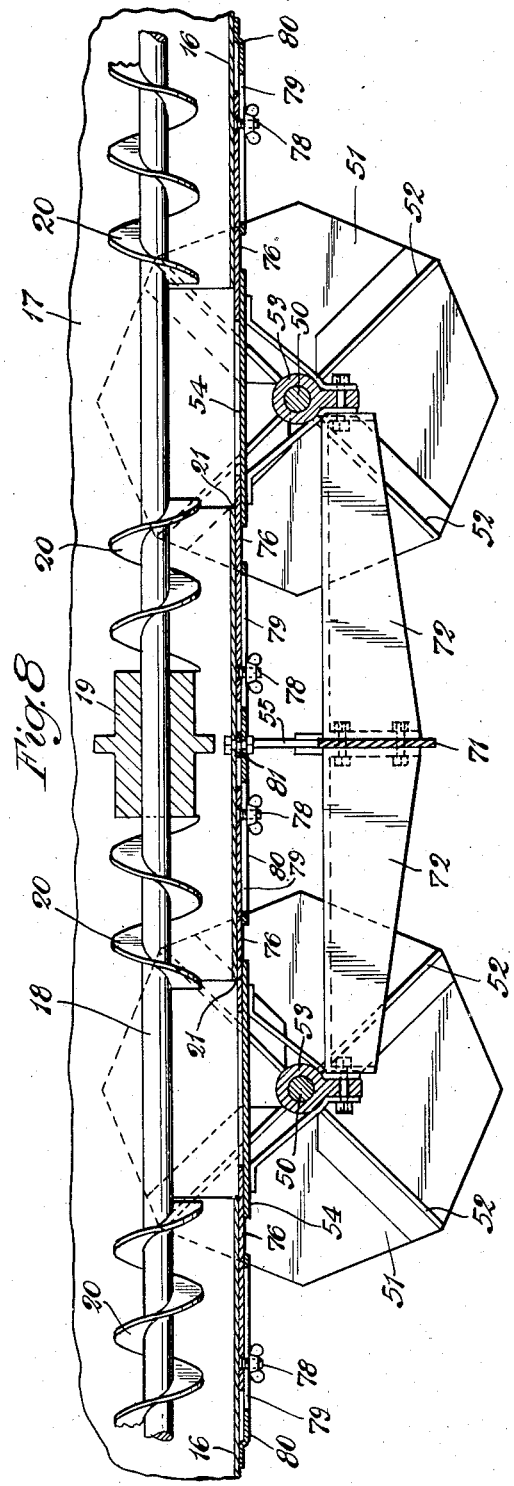
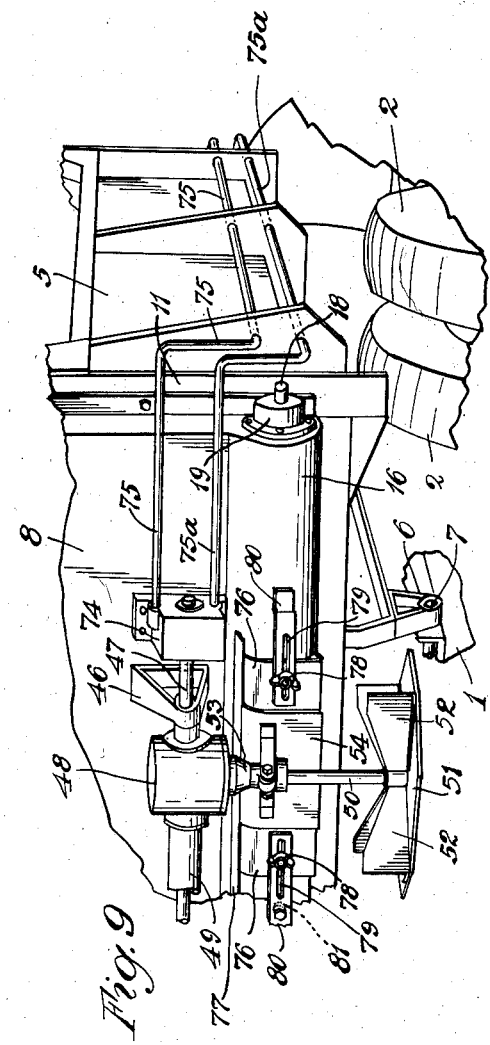
Inventor
Lester W. Wachter
by Parker & Carter
Attorneys.

Patented Oct. 11, 1949

2,484,325

UNITED STATES PATENT OFFICE 2,484,325

TIPPING SPREADER

Lester W. Wachter, Streator, Ill., assignor to Anthony Company, Streator, Ill., a corporation of Illinois Application February 5, 1945, Serial No. 576,246

5 Claims. (Cl. 275—8)

This invention relates to a spreading apparatus and particularly to an apparatus adapted to be mounted on a dump truck or tipping vehicle. It has for one object therefore to provide a mechanism for feeding material from a tipped container such as a truck body and for distributing the material so fed.

Another object is to provide means for spreading the material as it is distributed.

Another object is to provide means for retaining the distributing mechanism in vertical position at all positions of the tipping container.

A still further object is to provide means in connection with the distributing means for opening or closing the discharge opening as the container is tipped.

Another object is to provide means for driving the distributing mechanism either as a result of the motion of the vehicle or by independent power means, or by power means driven from the power plant of the vehicle and independent of the forward or rearward movement of the vehicle.

Other objects will appear from time to time throughout the specification and claims.

This invention is illustrated more or less diagrammatically in the accompanying drawings, wherein:

Figure 3 is a longitudinal section taken at line 3—3 of Figure 2 and showing the device in a tipped position;

Figure 4 is a plan view of the structure;

Figure 5 is a detailed end view of Figure 2;

Figure 6 is a plan view showing a modified drive;

Figure 7 is a perspective view showing a modified form in which separate power means are shown;

Figure 8 is a detailed section taken at line 8—8 of Figure 7;

Figure 9 is a partial rear elevation of a further modified form showing means for driving the distributor mechanism from the engine of the truck.

Like parts are indicated by like characters throughout the specification and the drawings.

Figure 1:
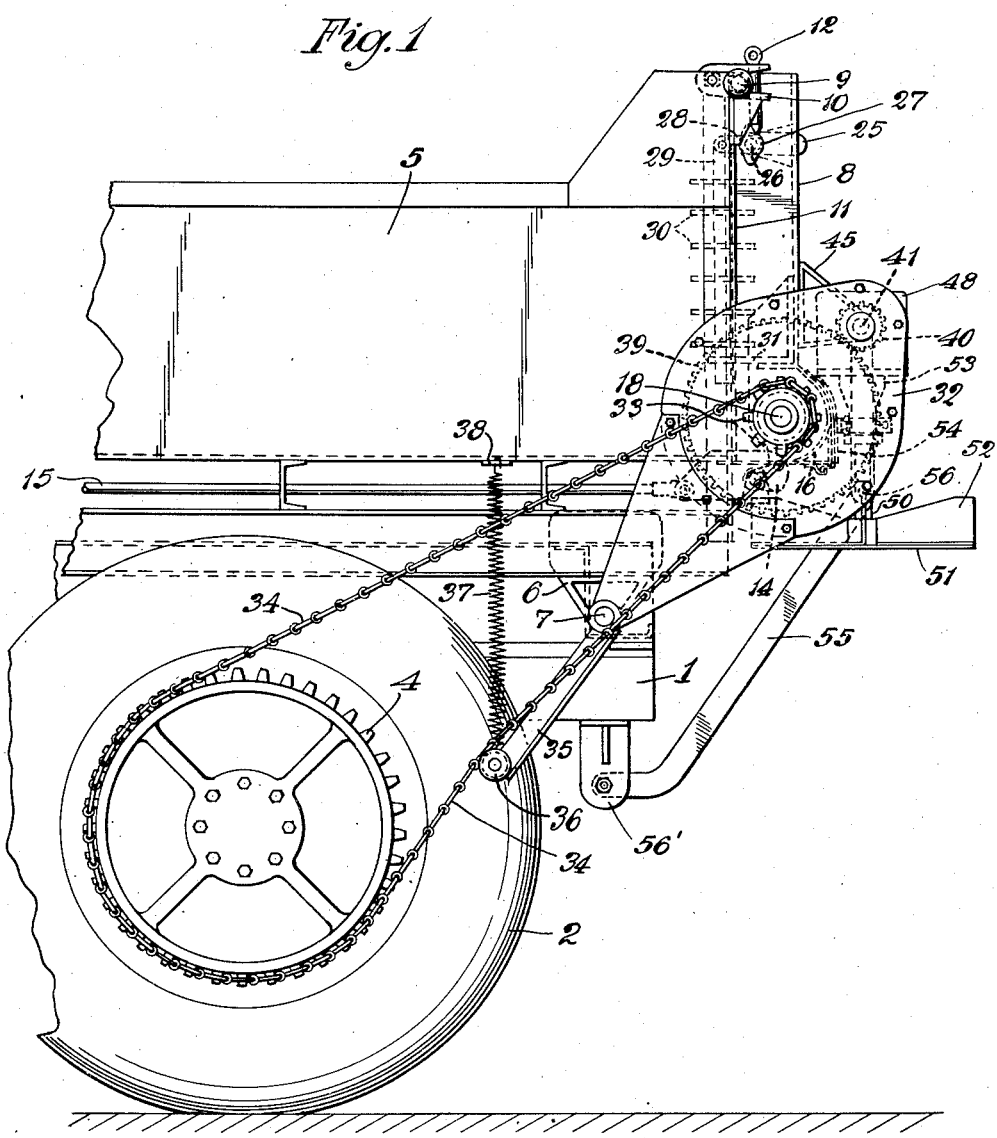
Figure 1 is a side elevation showing the mechanism mounted on a dump truck and in the upright or untipped position.

In the particular form here shown, the device is illustrated on a tipping truck. Only so much of the truck is shown as will be necessary for an understanding of the device. The truck comprises frame members 1 and is supported at its rear upon wheels 2 which are carried on an axle 3. The springs and other truck members are omitted. One of the wheels 2 may have a sprocket 4 mounted upon it for purposes to be described later. A body or container 5 is mounted upon the truck and is provided with members 6 which are pivoted, as at 7, upon any desired portion of the truck frame or chassis. Means for tipping the body 5 are provided, although not shown, because tipping trucks are well-known in the art and available on the market today.

The body may be tipped by any means. The distributing mechanism is mounted upon a closure member at the rear of the tipping body. Ordinarily tipping bodies not provided with distributors have tailgates mounted so as to be opened or closed. When the device of this invention is to be used, the conventional tailgate is removed and a closure member is substituted. This member may be bolted in place so that it cannot swing, or, if desired, it may be hinged so that it can swing and so that under certain circumstances it can act as a tailgate, even though the distributing means are mounted upon it.

Figure 2:
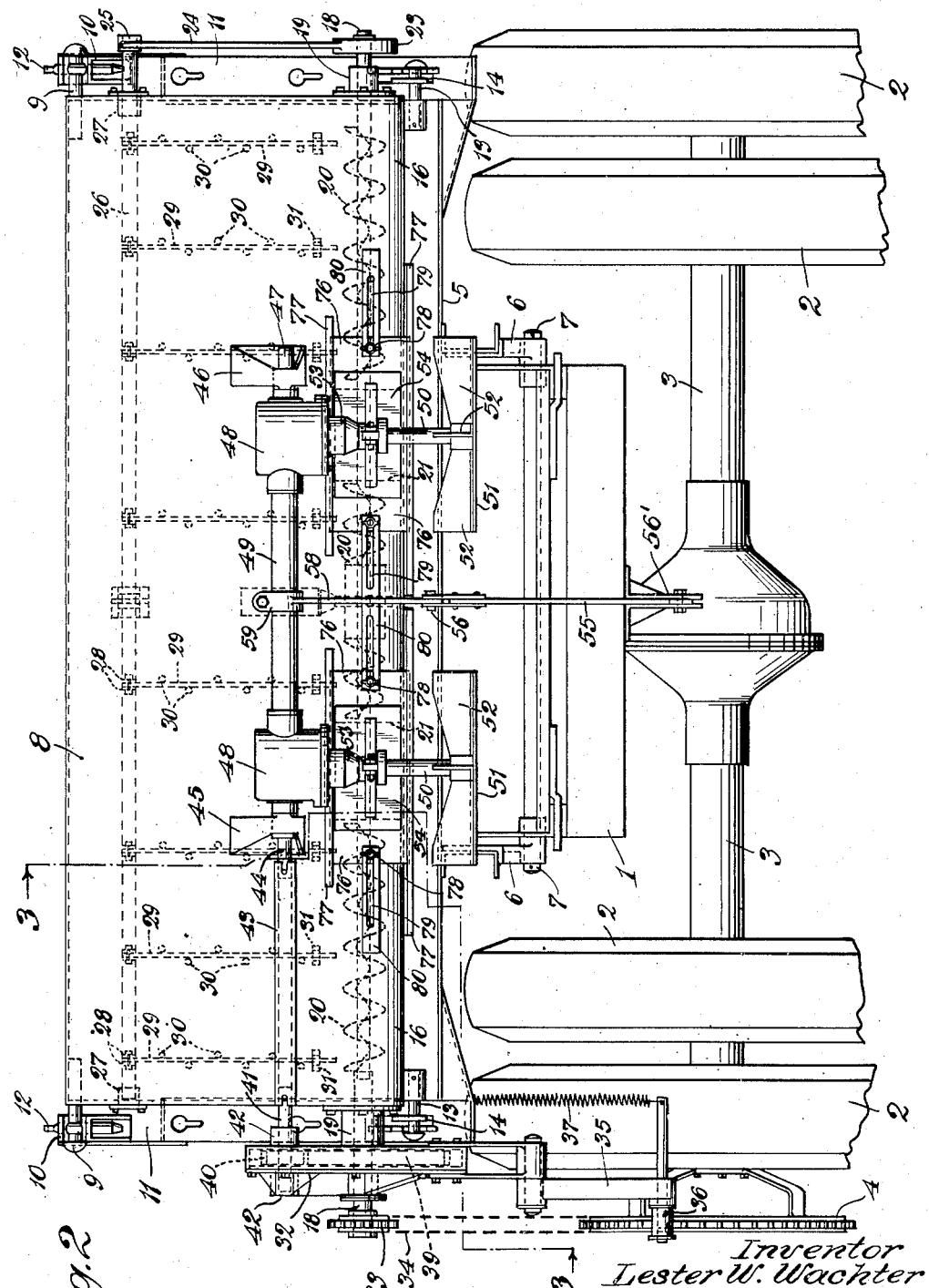
Figure 2 is a rear elevation of the device of Figure 1.

As shown in Figures 1, 2 and 3, the member which carries the distributing means is a tailgate and is pivoted for swinging and is provided with latches to hold it against swinging. As shown in Figure 5, the member is bolted in place and is in no sense a gate. The distributing means is mounted upon a member 8 which may be provided, adjacent its upper end at each side with a pair of pins 9 which are received in retaining members 10 supported on a portion 11 of the body frame. The member 9 is removably retained in the parts 10 by pins 12. Adjacent its lower end or edge the member 8 is provided with pins 13 which are engaged by latches 14 which are operated by rods 15. These latter are preferably connected to means at the forward end of the body or in the cab of the truck so that they can be operated by the driver without the necessity of leaving the cab. The member 8 is preferably provided with a rearwardly or outwardly curved portion 16, the lower margin of which is substantially on the same level as the floor or bottom 17 of the tipping body 5.

A shaft 18 is mounted in bearings 19, which are themselves mounted on the member 8, and the shaft carries a plurality of auger sections 20. As will be seen in Figure 8, these sections are differently directed, so that they move or tend to move the contents of the body toward discharge openings 21, of which two may be formed in the rear of the member 8. An eccentric 22 is mounted on the shaft and is engaged by a member 23 to which a connecting rod 24 is mounted. The connecting rod engages a lever 25 which is fixed to a shaft 26. This shaft is carried on bearings 27 and extends substantially across the rear of the body. A number of levers 28 are fixed on the shaft 26, and they carry downwardly depending members 29 to which pins or prongs 30 may be fixed.

Members 31 are fixed to the closure 8 and guide the rear ends of the members 29.

As a convenient means for synchronizing the various drives necessary for operating the auger and the distributor, a housing 32 is mounted upon one end of the member 8 and adapted to move with it. It may be made integrally or may be made of a number of pieces. The shaft 18 passes through the housing and carries adjacent it a sprocket 33. In the form shown in Figure 1 the sprocket 33 is engaged by a chain or belt 34 which is also positioned about the sprocket 4.

A radius arm 35 is pivoted about the center 7 and carries at its free end a roller 36 which is adapted to contact the chain 34. A spring 37 is connected at one end to the arm 35 and at the other end, as at 38, is anchored upon the body at any desired point.

Fixed on the shaft 18 and within the housing 32 is a gear 39. Positioned also within the housing 32 and meshing with the gear 39 is a pinion 40. This pinion is fixed on a shaft 41 carried in bearings 42 and may be connected to a sleeve 43 which engages a shaft 44, which latter is supported in a bracket 45. A corresponding bracket 46 supports an extension 47 of the shaft 44. The shaft 44, 47 passes into gear housings 48 within which beveled gear means are provided. A member 49 connects the housings 48 rigidly. From each of the gear housings 48 projects a vertical shaft 50. These shafts are driven from the shaft 44, 47 through the gears contained in the housings 48. The shaft 44 might be separate from and connected to the shaft 47 by a member which would pass through the sleeve 49. Whatever the construction, two shafts 50 are driven at the same speed by the gearing contained in the housings 48. Each shaft 50 carries adjacent its lower end a spinner or distributor which is formed with a solid or continuous bottom portion 51 and a plurality of preferably radially arranged vanes 52.

Projecting downwardly from the gear housings 48 are housing members 53 which are rigidly fixed with respect to the housings 48. Upon each of the housings 53 is mounted a cover member 54. These members are shown particularly in Figures 1, 2 and 3 and are so disposed as to overlie the outlet openings 21 in the member 8. They are preferably somewhat curved to correspond to the shape of the curved portion 16.

It will be seen that the assembly, including the gear housings 48, 48, the shafts 50 and the distributors 51, 52, is mounted as a unit and is carried for rotation upon the brackets 45 and 46. In order to retain the shafts 50 in vertical position at all times, irrespective of the position of the body 5, a radius rod or link 55 is provided. This member is pivoted at its lower end upon a bracket 56 which is mounted on any desired part of the non-tipping portion of the truck. At its upper end this member is pivoted, as at 56, to an arm 58 which is fixed upon the sleeve 49 by means of a collar 59 or otherwise.

In the modified form of Figure 6, the drive to the shaft 18 is accomplished by two chains, rather than by a single chain, as shown in Figures 1, 2 and 3. To accomplish this a stub shaft 60 is mounted in suitable bearings and carries a sprocket 61 about which a chain 62 is positioned. This chain engages the sprocket 4 and is driven by it. The belt or chain tensioning means is the same as that described in connection with Figure 1. A second sprocket 63 is mounted on the shaft 60. A chain 64 engages the sprocket 63 and also the sprocket 33 on the shaft 18 to drive it.

In the modified forms of Figures 7 and 8 means are shown for driving the device independently of the vehicle, and these means comprise an internal combustion engine. The drive for the various shafts is the same as that shown and described in connection with the earlier figures. The sleeve 49 is omitted and a shaft is formed of a portion 65 which may be integral with the portions 44 and 47.

If desired, a discontinuous shaft may extend clear through both of the gear housings 48 and the invention may embody, therefore, a continuous shaft or several shafts axially aligned and connected to rotate as one.

A pulley 66 is fixed on the shaft 65 and is driven by means of a belt 67 from the pulley 68 of an internal combustion engine 69.

The internal combustion engine is mounted upon a platform 70 from which a reinforcing extension 71 projects downwardly and is secured to stiffening members 72 which are themselves fastened to the housings 53. In this form of the device the radius rod or link 55 is secured to the lower end of the projection 71. By this means when the body is tipped the motors and the gear housings 48 and the housings 53, as well as the shafts 50 and the distributors 51 and 52, are retained in a vertical position, irrespective of the tipped or non-tipped condition of the body.

In order to provide room for the engine when the body is tipped, the member 8 is cut away opposite the body and is provided with an inwardly projecting portion 73 which closes the cut away portion of the member 8 and provides an enclosed space into which the engine projects when the body is tipped.

In the modified form of Figure 9, the shaft 47 is provided with a hydraulic or electric motor 74. The details of this motor are not shown, as they form no essential part of the invention. Many forms of electric motors or hydraulic motors suitable for driving the shaft are well-known and are available on the market. If a hydraulic motor is used, pressure fluid is directed to it and returned from it through conduits 75 and 75a. Pressure fluid may be furnished by a pump located at any desirable point on the total assembly.

Instead of the hydraulic motor 74, an electric motor may be used, and it will occupy generally the same space as that occupied by the hydraulic motor 74. Conductors for electric current will occupy substantially the position shown by the pressure fluid conduits 75 and 75a.

For some purposes, if the body is designed to spread only one sort of material, the discharge openings 21 may be of constant size. For other purposes, it is desirable to provide means for varying the size of the discharge openings. One such means is illustrated in Figures 2 and 8 in which on each side of each opening 21 there is positioned a shutter 76. These shutters are arranged to slide in guides 77 positioned above and below them and each shutter is provided with a set screw 78. The shanks of the set screws are arranged to slide in slots 79 formed in guiding and locking means 80. The shutters 76 are moved to the desired position and the set screws are tightened in the guides 80, and the shutters are thus held in adjusted position until they are again positively readjusted by the operator. The outermost guides 80 may conveniently be welded or otherwise fastened to the member 8 and the innermost guides may be mounted on a member 81 which is itself secured to the member 8.

Although I have shown an operative form of my invention, it will be recognized that many changes in the form, shape and arrangement of parts can be made without departing from the spirit of the invention, and my showing is therefore to be taken as, in a sense diagrammatic.

The use and operation of the invention are as follows:

The spreader of this invention is intended normally for application to a truck or to a trailer on which a tipping body or receptacle is mounted. The body may be tipped in any manner and by any suitable mechanical means and the invention is not limited to any particular form of tipping body or any particular means for tipping it. Tipping or dumping trucks are ordinarily equipped with a tail gate at the rear of the body so arranged that it may be opened when the body is tipped to discharge the load. When the device of the present invention is to be applied the tail gate ordinarily present will be removed and the member 8 which carries the spreader assembly will be substituted. This member may be pivotally mounted as shown in Figures 1, 2 and 3 on the mounting means normally provided for the conventional tail gate or it may be bolted or otherwise rigidly fastened in place as shown in Figure 5. In the one case it may serve under certain conditions as a tail gate as well as a spreader. In the other case it does not serve as a gate but merely as an end closure for the body and as a spreader. The operation of the spreading assembly is substantially the same whether the member 8 which carries it be mounted as a movable gate or be fixed in position.

Several different means for operating the spreader assembly drive have been indicated and in general the drive operates and performs in the same manner no matter how it is driven. Thus the feeding means within the body move material to the discharge openings and material falls through those openings onto the spreader members and is spread and discharged no matter by what means the drive is accomplished.

Considering the first form of the device as shown in the first five figures, the member 8 is put in place at the rear of the body and the member carries all of the essential parts of the mechanism so that it may be put in place or removed from a vehicle as a unit.

If the device is to be driven as a result of the movement of the vehicle a sprocket 4 will be mounted upon one of the wheels of the vehicle so as to be driven by the wheel as it rotates. The sprocket 4 is engaged by the chain 34 which in turn engages the sprocket 33 and through the gearing which includes the gear 39, the pinion 40, the drive shafts 41, 44 and 47, the spinner or spreader shafts 50 are actuated and the material is discharged to the spinners and is thrown laterally by the vanes or blades 52.

Ordinarily, of course, material will not be discharged from the body except when the latter is in the tipped position as shown in Figure 3 and the discharge openings are, therefore, closed except at the time that the body moves toward the tipped position and remains in the tipped position.

Assuming that the body has a load which is to be discharged and that the truck has been driven to the point where the load is to be discharged the tipping means will be actuated to tip the body. As this movement occurs the body tips from the position of Figure 1 to that of Figure 3 and the radius rod or link 55 holds the distributor assembly so that the shafts 50 remain vertical at all times.

The shafts 50 have supported from them through the housings 53 the closure members 54. When the body is in the untipped position as shown in Figure 1 these members overlie the discharge openings 21 from the body and hence close them. As the body tips, the shafts 50 and the housing 53, since they are held vertical, move relatively to the tipping body 5 and thus the closures 54 are moved away from the discharge openings 21 and free those openings for discharge.

At the same time if the vehicle is driven forward the shaft 18 is actuated and the augers upon it move material to the discharge openings 21 through which the material falls. The material falling through these openings drops toward the spinner or distributor members and is contacted by the paddles or blades 52 and is thrown laterally by them as they rotate. This action will continue as long as the truck is moved and as long as material remains to be discharged from the tipping body.

When the load has been discharged the body is returned to the untipped position of Figure 1 and by reason of the action of the member 55 the shafts 50 and the housings 53 carrying the closure members 54 return toward the body and the closure members are finally brought into position where they close the discharge openings 21.

The driving means of Figures 1 to 4, inclusive, may be left connected when the truck is in motion and not discharging material or it may be disconnected. The driving means may readily be disconnected by pressing downwardly on the arm 35 against the resistance of the spring 37. This action provides enough slack in the chain 34 to permit the operator to remove it so that the shaft 18 need not be driven. When it is desired to drive the device again the operation is reversed and the chain 34 is put into engagement with the sprockets 4 and 33 and the assembly is ready for driving.

For some purposes it is desirable to provide an agitator and the agitator which includes the members 29 and the pins 30 may be mounted on the member 8 if desired. Experience has shown that for most purposes this agitator is unnecessary, but if it is desired it is mounted as shown, and when present, rotation of the shaft 18 moves the eccentric 22, and through the member 23 which engages the eccentric, moves the rod 24 up and down and thus moves the member 25 which is connected to the shaft 26. The latter is oscillated by this movement and raises and lowers the members 29 which carry the pins 30.

The size of the discharge openings 21 is variable and variation in this opening may be accomplished by a variation in the setting of the shutters or slides which appear particularly in Figure 2. These slides may be manually adjusted to increase or decrease the size of the discharge openings 21 and these members once adjusted remain fixed in place. They do not constitute the closures for discharge openings, these openings being closed and opened by the members 54, one of which is supported from each of the housings 53 and these members are moved toward and from the openings 21 as described above.

The construction of the beveled gear within the housings 48 has not been shown because the invention is not limited to the particular structure of the gearing. In general it comprises a beveled gear on the shafts 44 and 47 or upon a continuous shaft which may be substituted for these two shafts. There is also a beveled gear on each shaft 50 and these gears mesh so that rotation of the shaft 41, the sleeve 43 and the shafts 44 and 47 result in rotation of the shafts 50.

The operation of the device as shown in Figure 6 is the same as that above described. Rotation of the sprocket 4 drives the chain 62 which drives the sprocket 61. Rotation of the sprocket 61 causes rotation of the sprocket 63 since both are mounted on the shaft 60 and rotation of the sprocket 63 drives the shaft 18 by means of the chain 64 and the sprocket 33.

In the modified form of the device shown in Figures 7 and 8 the rotation of the shaft 18 and through it the rotation of the shaft 41 and associated parts is accomplished not as a result of the movement of the vehicle but as a result of the operation of the internal combustion engine. This engine drives the pulley 66 which is mounted on a shaft 65. As pointed out above the shaft 65 may be connected to the shafts 44 and 47 or those two shafts may be omitted and a single shaft 65 may extend through both gear housings 48 and consequently rotation of the shaft 65 accomplishes rotation of the shafts 50. The engine assembly is mounted on a platform which moves as the body tips and its movement is controlled by the radius member 55 so that the shafts 50 and associated parts are held in vertical position at all degrees of tip in the same manner as that above described in connection with Figures 1 to 4 inclusive. As the body tips in the form of Figures 7 and 8 the member 8 moves downwardly toward the tipped position and since the engine assembly remains vertical the two pivot toward each other. The upper part of the engine in effect moves into the depression or compartment formed within the member 8 and thus the engine does not interfere with the movement of the body.

An advantage which occurs when the engine is used is that the engine may be operated at any time and therefore the spreading mechanism does not depend upon movement of the vehicle and is wholly independent of that movement. It might be operated while the vehicle is stationary. The use of an engine thus provides a somewhat more flexible drive for the spreader than that which is possible where the spreader is driven only as a result of the movement of the vehicle.

In the modified form of Figure 9 the spreader is driven by what is in effect a separate motor. It may be a hydraulic motor or an electric motor. If it is hydraulic it will be actuated by a pump. The pump itself may be controlled directly to control the rotation of the shaft 18 upon which the motor is arranged to drive or the motor might run constantly and the hydraulic system might be provided with valve controls which would enable the operator to control the movement of the hydraulic motor at all times.

Instead of a hydraulic motor an electric motor might be used and its operation would be substantially the same as that of the hydraulic motor. It would be stopped and started at the will of the operator to accomplish whatever driving effect is desired.

I claim:

1. In combination with an automotive vehicle, a tipping body thereon and a unitary spreader assembly adapted to be mounted thereon as a unit, said spreader assembly comprising an end closure for said body and a plurality of mechanisms mounted on and supported by said closure, said closure shaped to provide a plurality of discharge openings adjacent its lower edge, said mechanisms including a conveyor member mounted within said end closure, having a shaft and shaped to convey material to said discharge openings, and means for spreading material after it passes through said openings, said means including a plurality of spreader members, each having a shaft, means for holding said shafts vertical irrespective of the position of said body, closures for said discharge openings, said closures being mounted upon and adapted to move with said shafts, and means for driving said shafts, said means being connected to means for driving said conveyor and a flexible member positioned about said conveyor shaft and about a member which is rotated by a portion of the running gear of said vehicle.

2. In combination with an automotive vehicle, a tipping body thereon and a unitary spreader assembly adapted to be mounted thereon as a unit, said spreader assembly comprising an end closure for said body and a plurality of mechanisms mounted on and supported by said closure, said closure shaped to provide a plurality of discharge openings adjacent its lower edge, said mechanisms including a conveyor member mounted within said end closure, having a shaft and shaped to convey material to said discharge openings, adjustable means for varying the size of said openings and means for spreading material after it passes through said openings, said means including a plurality of spreader members, each having a shaft, means for holding said shafts vertical irrespective of the position of said body, closures for said discharge openings, said closures being mounted upon and adapted to move with said shafts, and means for driving said shafts, said means being connected to means for driving said conveyor and a flexible member positioned about said conveyor shaft and about a member which is rotated by a portion of the running gear of said vehicle and yieldable means for maintaining suitable tension in said flexible member and a material agitating means mounted on said end closure and driving connections for moving said agitating means, said connections being actuated by movement of said conveyor shaft.

3. In combination with an automotive vehicle, a tipping body mounted thereon and a unitary spreading assembly complete within itself, said assembly comprising a supporting member mounted on the rear of said receptacle and comprising an end closure therefor, said end closure provided with a discharge opening through which material may be discharged from the body and means for moving material within the body toward said opening and spreader means for spreading material after it passes through said opening, said spreader means comprising a member positioned to rotate about a vertical axis and having a plurality of blades, and means for rotating said spreader member, and means for maintaining the axis of said spreader member constantly vertical irrespective of the position of said body and means for driving said spreading assembly, and a closure member for said discharge opening, said closure member being provided with means to move it away from said opening as the body is tipped and to return to said opening as the body moves to the untipped position.

4. In combination with an automotive vehicle, a tipping body mounted thereon and a unitary spreading assembly complete within itself, said assembly comprising a supporting member mounted on the rear of said receptacle and comprising an end closure therefor, said end closure provided with a discharge opening through which material may be discharged from the body and means for moving material within the body toward said opening and spreader means for spreading material after it passes through said opening, said spreader means comprising a member positioned to rotate about a vertical axis and having a plurality of blades, and means for rotating said spreader member, and means for maintaining the axis of said spreader member constantly vertical irrespective of the position of said body and means for driving said spreader assembly as a result of the movement of said vehicle, and a closure member for said discharge opening, said closure member being provided with means to move it away from said opening as the body is tipped and to return to said opening as the body moves to the untipped position.

5. In combination with an automotive vehicle, a tipping body mounted thereon and a unitary spreading assembly adapted to be removably mounted on said body as a unit, said assembly comprising a supporting member mounted on the rear of said receptacle and comprising an end closure therefor, said end closure provided with discharge openings adjacent its lower edge through which material may be discharged from the body and means for moving material within the body toward said openings and means for agitating material within said body adjacent said openings and a plurality of spreader means for spreading material after it passes through said openings, each of said spreader means comprising a member positioned to rotate about a vertical axis and having a plurality of blades, and means for rotating said spreader members, and means for maintaining the axis of said spreader members constantly vertical irrespective of the position of said body and means for driving said spreader assembly as a result of the movement of said vehicle, and a closure member for each of said discharge openings, said closure members being provided with means to move them away from said openings as the body is tipped and to return to said openings as the body moves to the untipped position.

LESTER W. WACHTER.

REFERENCES CITED

The following references are of record in the file of this patent:

UNITED STATES PATENTS

| Number | Name | Date |
|---|---|---|
| 1,285,183 | Holden | Nov. 19, 1918 |
| 1,880,155 | Ruth | Sept. 27, 1932 |
| 1,928,030 | Putnam | Sept. 26, 1933 |
| 2,044,652 | Walker | June 16, 1936 |
| 2,057,759 | Bissell | Oct. 20, 1936 |
| 2,099,369 | Lutz | Nov. 16, 1937 |
| 2,162,689 | Mayfield | June 20, 1939 |
| 2,334,376 | Bauer | Nov. 16, 1943 |
| 2,338,320 | Donovan et al. | Jan. 4, 1944 |
| 2,340,657 | Goertzen | Feb. 1, 1944 |
| 2,421,211 | Lutz | May 27, 1947 |